May 14, 1929.  C. A. BURGER  1,713,373
SPARK PLUG TOOL
Filed Feb. 13, 1926
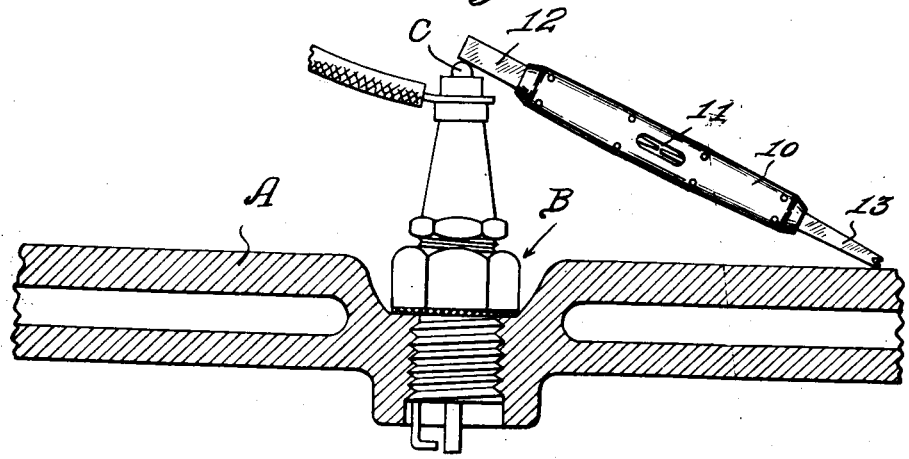
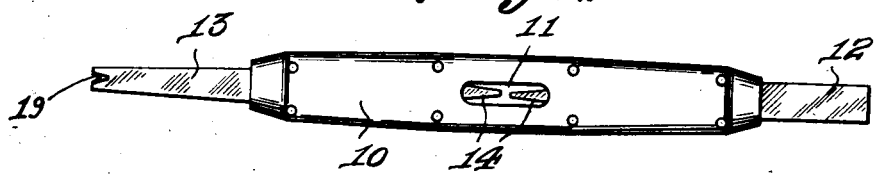
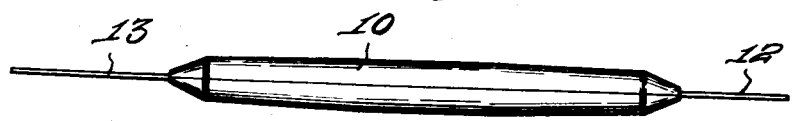
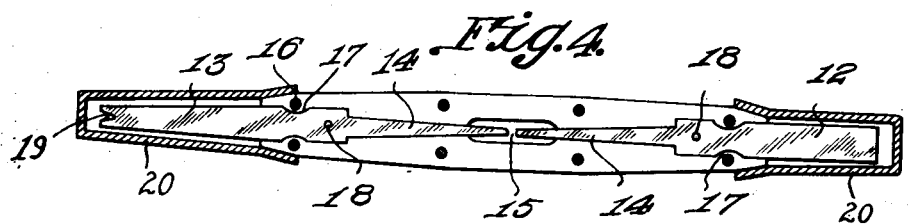
C. A. Burger, INVENTOR
BY Victor J. Evans
ATTORNEY
WITNESS:

Patented May 14, 1929.

1,713,373

UNITED STATES PATENT OFFICE.

CHARLES A. BURGER, OF SPRINGFIELD, MISSOURI, ASSIGNOR OF FORTY-FIVE ONE-HUNDREDTHS TO NELLE G. BURGER, OF SPRINGFIELD, MISSOURI.

SPARK-PLUG TOOL.

Application filed February 13, 1926. Serial No. 88,075.

This invention relates to special tools intended for use by auto mechanics and others and has for its object the provision of a novel tool by means of which spark plugs may be tested and the various parts thereof cleaned, the device embodying a gap across which a spark will jump in case a tested plug is in proper and firing condition.

An important object is the provision of a tool of this character which will be simple and inexpensive in manufacture, easy to use, positive in action, efficient and durable in service, and a general improvement in the art.

With the above and other objects and advantages in view, the invention consists in the details of construction, and the arrangement and combination of parts to be hereinafter more fully described and claimed, and illustrated in the accompanying drawings, in which:—

Figure 1 is a fragmentary section through a portion of an engine showing a spark plug and illustrating the tool in applied position for testing.

Figure 2 is a side elevation of the tool alone.

Figure 3 is an edge view, and

Figure 4 is a longitudinal section.

Referring more particularly to the drawings, I have shown the device as comprising a casing including similar side members 10 formed of any suitable insulating material and of any preferred dimensions. These side members have beveled ends and are provided at their central portions with elongated openings 11 for a purpose to be described.

Located between the side members 10 and received in recesses formed in the confronting faces thereof are elongated metallic blade members 12 and 13 which have their inner ends 14 tapered and elongated to form extensions which terminate in spaced relation to define a gap 15 opposite the openings 11. The tapered inner ends are formed with the members 12 and 13 in a manner to provide shoulders engageable with like shoulders formed in the recesses. The members 10 are secured together by means of rivets 16 or the like and it is preferable that the blade members 12 and 13 be concaved at their opposite edges as indicated at 17 and these concavities receive projections which extend into the recesses as best shown in Figure 4 of the drawings and passing through these projections are the outermost set or pairs of rivets as clearly indicated, so that there will be no possibility whatsoever for the blade members to become longitudinally displaced from any cause. In addition, a dowel pin 18 is fitted into each of the blades 12 and 13 to further secure them in place, the dowel pins penetrating the sections of the handle. The rivets are to be countersunk and the heads covered with suitable insulating material.

The blade member 12 of course projects beyond the end of the casing formed with the two members 10 and constitutes a scraper by means of which any accumulation of carbon or soot, together with oil or other matter may be scraped off from the outside of the spark plugs.

The blade 12 is also to be used as a gage or spacer for the electrodes of the plug, this blade having a thickness exactly corresponding to the proper distance between the electrodes. The blade 13 is preferably tapered and it is intended to be used as a scraper for removing any accumulation or deposit from the inside of the skirt of a spark plug. Furthermore, the terminal of the blade member 13 is preferably concaved or notched, or recessed, as it may be described, as indicated at 19 so that it may be used for cleaning the electrodes or the terminal wires, as the case may be.

In Figure 1, I have shown the device in use as means for testing whether or not a plug is in firing condition. Referring to this view, the letter A designates a portion of an internal combustion engine, B designates, generally, a spark plug mounted therein and C designates the central terminal of the plug.

In the operation of the device, it is of course apparent that the blades 12 and 13 may be used as above indicated and when it is desired to test the plug to see whether or not it is short circuited or otherwise defective, the device is taken in the hand and one blade member is engaged upon the central terminal C of the plug and the other blade engaged upon the engine A at any convenient point. If the plug is in good firing order a spark will be caused to jump across the gap 15 whereas if the plug is so foul that it cannot fire or if the porcelain is cracked or any other defect exists there will be no spark visible through the opening 11 at the gap 15.

From the foregoing description and a study of the drawings, it will be apparent that I have thus provided a very simply constructed device for the purpose specified and one which may be manufactured at a very slight cost. The device is easy to handle, is not cumbersome and is adapted for a plurality of purposes so that it should be of great advantage to every motorist or repairman. If desired, caps 20 may be provided for the ends of the device so as to cover the blades when not in use.

While I have shown and described the preferred embodiment of the invention, it should be understood that I reserve the right to make such changes in the form, construction and arrangement of parts as will not depart from the spirit of the invention or the scope of the subjoined claims.

Having thus described the invention, I claim:—

In a spark plug tool, a handle formed from a pair of side members of insulating material and being centrally provided with cooperating elongated openings and beveled ends; said side members being secured together and provided with cooperating recesses in their confronting faces, elongated metallic blade members fitting conformingly within the recesses and having tapered inner end portions spaced apart to define a spark gap disposed centrally of the openings, said tapered end portions being formed with said blade members in a manner to provide shoulders engageable with shoulders formed in the cooperating recesses, projections formed with the side members and extending into the recesses thereof to be received in concavities provided in the opposite edges of the blade members and cooperating with the shoulders and means for securing the blade members to the side members to prevent longitudinal movement of the blade members which project beyond the outer ends of the handle as and for the purpose specified.

In testimony whereof I affix my signature.

CHARLES A. BURGER.